C. LEONARD.
FISHING TACKLE.
APPLICATION FILED OCT. 23, 1916.
1,222,774.
Patented Apr. 17, 1917.
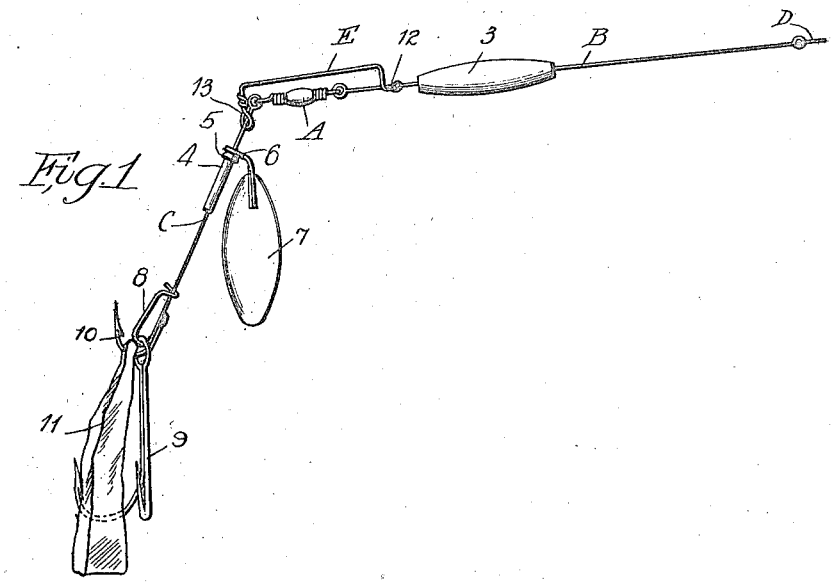
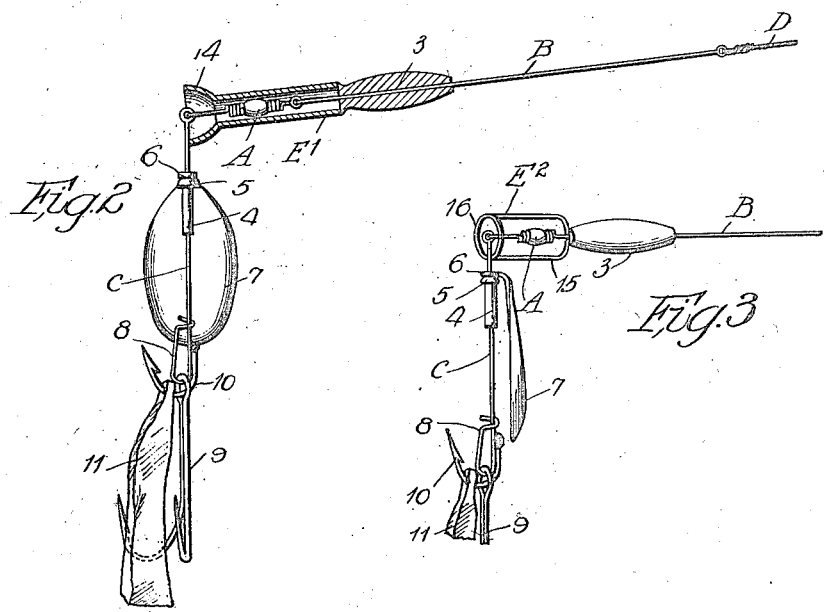
Witness
Albin C. Ahlberg
Inventor
Charles Leonard
By Williams Bradbury & Lee
Attorneys

UNITED STATES PATENT OFFICE.

CHARLES LEONARD, OF LAKE GENEVA, WISCONSIN.

FISHING-TACKLE.

1,222,774.

Specification of Letters Patent.   Patented Apr. 17, 1917.

Application filed October 23, 1916.   Serial No. 127,093.

*To all whom it may concern:*

Be it known that I, CHARLES LEONARD, a citizen of the United States, residing at Lake Geneva, in the county of Walworth and State of Wisconsin, have invented certain new and useful Improvements in Fishing-Tackle, Case 1, of which the following is a full, clear, concise, and exact description, reference being had to the accompanying drawings, forming a part of this specification.

My invention relates to fishing tackle, more particularly to that class of fishing tackle wherein a trolling spoon or spinner is employed, and the object of my invention is to provide a simple and efficient arrangement and combination of parts whereby I obviate an objectionable feature commonly found in fishing tackle of this class to wit: the tendency of the hooks to lash back and catch upon the line during the course of casting or trolling.

In the fishing tackle embodying my invention the spoon or spinner is carried upon a somewhat rigid member connected through a swivel connector with a second somewhat rigid member arranged to be attached to the end of the casting and trolling line. The swivel connection between the two rigid member permits the proper and most efficient operation of the spoon or spinner. It will be understood that the hooks and bait, either natural or artificial, are attached to that one of the rigid members upon which the spoon or spinner is mounted and carried. I find that it is essential that the weight or sinker be carried above the swivel connection in order to permit the most effective operation of the spoon or spinner which is mounted below the swivel, but when the weight or sinker is thus mounted above the swivel considerable difficulty and annoyance is experienced, due to the tendency of hooks to lash back around the swivel connection and become caught in the line during casting and trolling. My present invention provides devices extremely simple in construction and arrangement which effectually serve to obviate this difficulty and annoyance heretofore inherent in fishing tackle of the class mentioned.

In the accompanying drawings illustrating my invention,

Figure 1 is an elevational view of a fishing tackle embodying the improvements of my invention;

Fig. 2 illustrates a modification of my invention; and

Fig. 3 illustrates a further modification of my invention.

Similar characters of reference refer to similar parts throughout the several views.

In the drawings A indicates a double swivel which connects the adjacent ends of a pair of relatively rigid elements B and C. It is to be understood that while the members B and C are described as rigid, they need not be entirely inflexible. In fact, I prefer to construct the member B of rather fine though stiff wire and the member C of material that is a little less flexible than the material of which the member B is constructed. That end of the member B opposite the swivel A is provided with a loop whereby it may be attached to the casting and trolling line D. I wish to have it understood that while the member "A" has been described as a double swivel connector of any suitable type a single swivel may be employed if desired without departing from the scope of my invention. Formed upon the member B at a point intermediate the swivel connector A and the line D is the weight or sinker indicated by the reference numeral 3. It is essential that the weight or sinker 3 be carried between the swivel A and the line D in order that the member C may have that freedom essential to the successful operation of the spoon or spinner presently to be referred to in detail. Fitted upon the rigid member C is a sleeve 4 above which is carried a washer 5 loosely mounted upon the rigid member C and having a frustro conical upper surface arranged to coöperate with the loop 6 of the spoon or spinner 7. It will be understood that when the parts just described are drawn through the water in trolling the spoon 7 is caused to spin around the member C in the usual manner to attract the attention of the fish in the vicinity where the trolling occurs. At its lower end the rigid member C is turned back upon itself as indicated at 8 to provide a loop which serves to carry the hook pair 9. Conveniently soldered to the looped lower end of the member C is a small hook 10 which may serve as the means of attaching any suitable bait which I have elected to illustrate in the form of a strip of bacon 11.

When only the parts thus far described are employed considerable difficulty is experienced in casting and trolling, due to the fact that because the weight 4 is located above the swivel A there is a decided tendency for the hooks carried by the member C to lash back around the swivel A and become caught in the line. In the embodiment of my invention illustrated in Fig. 1, the means which, while not in any way interfering with the necessary freedom of the member C and the proper operation of the spoon 7, successfully prevents the hooks from being caught in the line, is in the form of a wire member E, having two offset ends, one of which is soldered to the member B at a point intermediate the swivel A and the weight or sinker 14, as indicated at 12. The other offset end of the member E is turned back and twisted around itself to provide a loop 13 which embraces and fits loosely around that end of the member C which is attached to the swivel connector A. It will be noted that the member E thus spans the swivel connector A and effectively prevents the hooks from at any time assuming such a position with respect to the member B that the hooks may become caught in the line. It is important to note, however, that although the member E prevents the hooks from so turning around the swivel connector A that the hooks may become caught, this result is accomplished without in any way interfering with that freedom of the member C and spoon 7, which is so essential to successful trolling.

In Figs. 2 and 3 all parts not materially different from corresponding parts illustrated in Fig. 1 have had corresponding reference characters applied thereto. In the modification of Fig. 2 the means which prevents the hooks from catching the line, but which means does not interfere with the freedom of the parts below the swivel, is in the form of a sleeve $E^1$, having its upper end attached to the weight or sinker 4 as by casting the latter upon the sleeve $E^1$. The sleeve 14 extends over the swivel A and has its lower end belled as illustrated at 14. It will thus be seen that the member $E^1$, although it does not in any way interfere with the necessary freedom of the parts below the swivel connector successfully prevents the hooks from being caught in the line during casting and trolling.

In the modification of Fig. 3 the means for accomplishing the object of my invention is in the form of a member $E^2$ comprising two parallel wire elements 15—15, each of which has an offset end soldered or otherwise attached to the member B at a point adjacent the weight or sinker 4. The other ends of the wire members 15—15 are soldered or otherwise attached to a ring 16 which lies in the plane at which the end of the member C is attached to the swivel connector. It will be noted that the device $E^2$ performs the same function as the device $E^1$ of Fig. 2 in practically the same way.

While I have illustrated my invention in the particular embodiments herein shown and described, I do not limit myself to these particular constructions, but desire to have the scope of my invention limited only by the appended claims.

What I claim as new and desire to secure by Letters Patent of the United States, is:

1. In a fishing tackle comprising a pair of pivotally connected and comparatively rigid members, one of which is adapted to be attached to a line, a weight or sinker carried by said last mentioned member at a point intermediate the line and the pivotal connection, a spoon and hooks carried by the other one of said comparatively rigid members and means located at the point where said members are pivotally connected arranged and adapted to prevent the hook and spoon carrying member from at any time assuming a position at an acute angle with the weight carrying member whereby the hooks are prevented from becoming caught upon the line during casting and trolling operations when the line is taut.

2. In a fishing tackle comprising a pair of pivotally connected members, one of which is adapted to be attached to a line, a weight or sinker upon said last mentioned member at a point intermediate the line and the point where said members are pivotally connected one to the other, hooks carried by the other one of said members, and means for preventing the hook carrying member from assuming such an angle with respect to the weight carrying member that the hooks may engage the line during casting and trolling when the line is taut.

3. In a fishing tackle the combination with a first comparatively rigid member arranged to be attached to a line, a weight or sinker carried by said member, a second comparatively rigid member, hooks and a spoon or spinner carried by said member and devices for pivotally connecting said members arranged to permit sufficient movement between said members to insure the proper operation of the spoon or spinner, but adapted to prevent the second member from assuming such an angle with respect to the weight carrying member that the hooks may engage the line during casting or trolling when the line is taut.

4. In a fishing tackle the combination with a pair of comparatively stiff members, one of which is adapted to be attached to a line, a weight or sinker carried by said last mentioned member, a spoon and hook carried by the other one of said members, together with a swivel connection between said members and means for preventing the said members from assuming such an angle one with the other that the hook may engage the line during casting or trolling when the line is taut.

In witness whereof, I hereunto subscribe my name this 8 day of September, A. D. 1916.

CHARLES LEONARD.

Witnesses:
L. MAE CORBIN,
HENRY KIMBALL.